Figure 1:
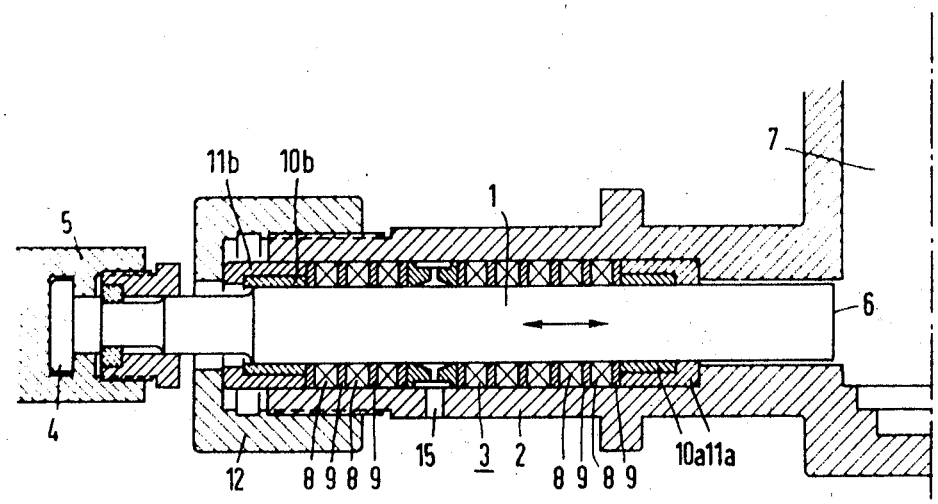

United States Patent
Schettler

[15] 3,655,207
[45] Apr. 11, 1972

[54] SEALING AND LUBRICATING DEVICE FOR PISTON PUMP PLUNGER

[72] Inventor: Kurt Schettler, Erlangen, Germany
[73] Assignee: Siemens Aktiengesellschaft, Berlin and Munich, Germany
[22] Filed: Jan. 19, 1970
[21] Appl. No.: 3,793

[30] Foreign Application Priority Data

Jan. 31, 1969 Germany............P 19 04 758.6

[52] U.S. Cl.............................................277/125
[51] Int. Cl.............................................F16j 15/18
[58] Field of Search...................277/125, 123, 102, 124

[56] References Cited

UNITED STATES PATENTS 464,935  12/1891  Dudoire..................277/125

Primary Examiner—Robert I. Smith
Attorney—Curt M. Avery, Arthur E. Wilfond, Herbert L. Lerner and Daniel J. Tick

[57] ABSTRACT

Each of a plurality of intermediate rings is positioned between a pair of next-adjacent packing rings and has an inner surface bordering the plunger of a piston pump. Each of the intermediate rings has a substantially annular groove formed in the inner surface thereof.

5 Claims, 2 Drawing Figures

Patented April 11, 1972  3,655,207

SEALING AND LUBRICATING DEVICE FOR PISTON PUMP PLUNGER

It is known practice in high pressure piston pumps to seal the plunger against the cylinder housing and the atmosphere by stuffing box seals or packing. A stuffing box leakage of several liters per hour is usually permissible and is required for the lubrication and cooling of the plunger.

When piston pumps of the aforedescribed type are included in nuclear reactors for transporting radioactive liquids, a stuffing box leakage of several liters per hour is much too high. This is particularly true when heavy water is to be transported by such pumps. The best possible sealing of the stuffing box is required under these circumstances, so that leakages of less than 1 liter per day must not be exceeded. The leakage may not be reduced to the required maximum by conventional means, however.

The principal object of the invention is to provide a new and improved device for sealing and lubricating a piston pump plunger.

An object of the invention is to provide a stuffing box seal or packing for a piston pump plunger, which packing has a high density and simultaneously provides the required lubrication of the plunger.

An object of the invention is to provide a piston pump plunger packing which functions to seal and lubricate with efficiency, effectiveness and reliability.

An object of the invention is to provide a piston pump plunger packing of simple structure.

In accordance with the invention, a device for sealing and lubricating the plunger of a piston pump comprises a stuffing box packing having a plurality of spaced packing rings around the plunger of the piston pump. A plurality of intermediate rings are positioned around the plunger. Each of the intermediate rings is positioned between a pair of next-adjacent packing rings and has an inner surface bordering the plunger. Each of the intermediate rings has a substantially annular groove formed in the inner surface thereof.

The groove formed in the inner surface of each of the intermediate rings is filled with liquid. The packing rings and the intermediate rings are coaxially positioned with and around the plunger and are so positioned along the length of the plunger that the packing rings and the intermediate rings alternate. The groove formed in the inner surface of each of the intermediate rings opens on more than half the inner surface.

The intermediate rings positioned between the packing rings provide liquid rings which supply a molecular lubrication of the surface of the plunger of the piston pump and thereby prevent overheating or burning of the individual components thereof.

Figure 2:
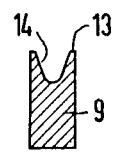

In order that the invention may be readily carried into effect, it will now be described with reference to the accompanying drawing, wherein:

FIG. 1 is a longitudinal sectional view of a plunger and an embodiment of the sealing and lubricating device of the invention; and FIG. 2 is a radial sectional view of an intermediate ring of the sealing and lubricating device of the invention.

In the FIGS., the same components are identified by the same reference numerals.

In FIG. 1, a plunger 1 reciprocates within a stuffing box packing 3 mounted in a cylinder housing 2. The left end of the plunger 1 is coupled to a drive 5 via a crosshead 4. Liquid is transported by the piston pump, of which the plunger 1 forms a part, via the right end 6 of said plunger and valves, which are not shown in the FIGS., upward through a pump housing 7.

The stuffing box packing 3 comprises a plurality of packing rings or seals 8, of soft packing. The packing rings are coaxially positioned around the plunger 1 in spaced relation with each other. A plurality of intermediate rings 9 are coaxially positioned around the plunger 1 between the packing rings 8 in a manner whereby each intermediate ring is positioned between a pair of next-adjacent packing rings.

The axial ends of the plurality of packing rings 8 and intermediate rings 9 are clamped in position in the cylinder housing by slide rings 10a and 10b and sealing rings 11a and 11b. The slide rings 10a and 10b and the sealing rings 11a and 11b enclose the packing rings 8. The intermediate rings 9 and said sealing rings usually comprise synthetic material. The packing rings 8 and the intermediate rings 9 are axially compressed by a clamping sleeve 12 affixed to the free or open end of the cylinder housing 2.

The intermediate rings 9 comprise a material which is more firm than the material comprising the packing rings 8. As shown in FIG. 2, which is on a considerably enlarged scale compared to FIG. 1, each of the intermediate rings 9 has a substantially annular groove 14 formed in the inner surface 13 thereof bordering the plunger 1. The groove 14 of each of the intermediate rings 9 is filled with liquid and opens on more than half the inner surface 13 of said intermediate ring. Each of the grooves 14 automatically fills with liquid upon the commencement of operation of the pump. Within approximately two-thirds of the stuffing box packing, as viewed from the high pressure side, the cylinder housing 2 contains a bore 15 which functions as a blocking or locking water connection for the stuffing box packing 3. If, for example, a pressure of 100 atmospheres is to be maintained on the high pressure side, the pressure in the right-hand portion of the stuffing box packing 3 may be reduced, up to the water connection 15, to approximately 3.5 atmospheres. Therefore, in the remaining stuffing box packing 3, up to the left-hand end thereof, only a pressure of 3.5 atmospheres may be controlled against atmospheric pressure.

Since the spaces between the intermediate rings 9 are relatively small, in axial direction, a dry run of the plunger 1 within the stuffing box packing 3 is prevented by the liquid in the grooves 14 of said intermediate rings. This prevents the development of a damagingly high heat which will result in the burning of the packing or cause a breakthrough of the liquid. The liquid of the grooves 14 of the intermediate rings 9 provides adequate cooling of the plunger 1 at all times, as well as high density of the packing against a possibly emerging liquid.

The sealing and lubricating device of the invention, as hereinbefore described, is particularly well suited for sealing the plunger of a piston pump or other reciprocating components. The sealing and lubricating device of the invention may also be utilized to seal rotating shafts of, for example, centrifugal pumps, especially when the liquid to be transported contains impurities which would readily damage the slide ring packings customarily utilized in centrifugal pumps.

While the invention has been described by means of a specific example and in a specific embodiment, I do not wish to be limited thereto, for obvious modifications will occur to those skilled in the art without departing from the spirit and scope of the invention.

I claim:

1. A device for sealing and lubricating the plunger of a piston pump, comprising:
    a stuffing box packing having a plurality of spaced packing rings around the plunger of the piston pump; and
    a plurality of intermediate rings around said plunger, each of said intermediate rings being positioned between a pair of next-adjacent packing rings and having an inner surface bordering said plunger, each of said intermediate rings having a substantially annular groove formed in the inner surface thereof.

2. A device as claimed in claim 1, wherein the groove formed in the inner surface of each of said intermediate rings is filled with liquid.

3. A device as claimed in claim 1, wherein said packing rings and said intermediate rings are coaxially positioned with and around said plunger and are so positioned along the length of said plunger that said packing rings and said intermediate rings alternate.

4. A device as claimed in claim 3, wherein the groove formed in the inner surface of each of said intermediate rings opens on more than half said inner surface and is filled with liquid.

5. A device as claimed in claim 1, wherein the groove formed in the inner surface of each of said intermediate rings opens on more than half said inner surface.

* * * * *